Oct. 4, 1932.    W. H. EASTLAKE    1,880,917
METHOD OF AND APPARATUS FOR TESTING COATING MATERIALS
Filed Oct. 17, 1929
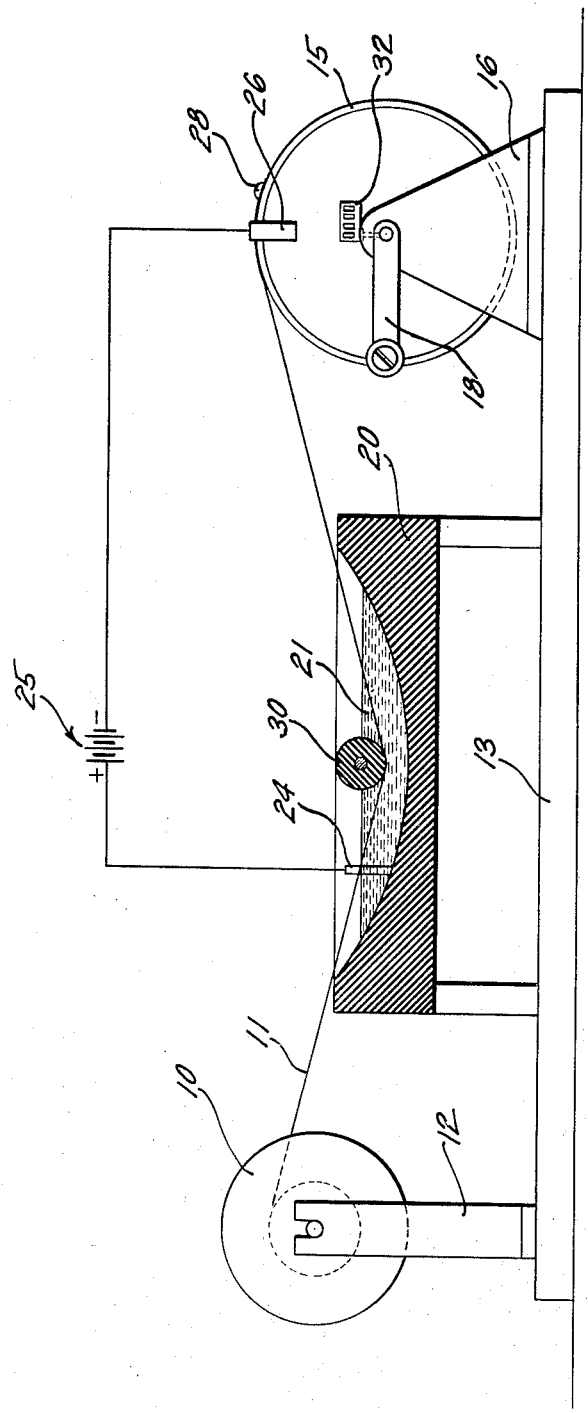
Inventor
William H. Eastlake
By *H. A. Patterson* Att'y.

Patented Oct. 4, 1932

1,880,917

UNITED STATES PATENT OFFICE

WILLIAM H. EASTLAKE, OF MOUNT ROYAL, QUEBEC, CANADA, ASSIGNOR TO WESTERN ELECTRIC COMPANY, INCORPORATED, A CORPORATION OF NEW YORK

METHOD OF AND APPARATUS FOR TESTING COATING MATERIALS

Application filed October 17, 1929. Serial No. 400,364.

This invention relates to a method of and apparatus for testing coating materials, and more particularly to a method of and apparatus for testing enamel insulating coatings on wires or electrical conductors.

Objects of the invention are to provide a simple, inexpensive, and efficient method of and apparatus for testing coating materials.

One embodiment of the invention contemplates the provision of a method of and apparatus for testing baked enamel insulating coatings on wires, wherein the enameled wire is electrically connected at one end to the negative side of a direct current supply source and then passed through a bath of electrolyte electrically connected to the positive terminal of the same source of current. By observing the frequency of the hydrogen gas evolution, the number of poorly insulated or bare spots in a predetermined length of the wire is ascertained.

It is believed that the invention will be clearly understood from the following detailed description, reference being had to the accompanying drawing which illustrates, diagrammatically, an apparatus embodying the features of the invention and by means of which the method may be practiced.

As shown in the drawing, a spool or reel 10 containing a supply of enamel insulated wire 11 is rotatably supported in a vertical standard 12 mounted near one end of a base plate 13. A metallic take-up drum 15 is rotatably supported in a vertical standard 16 mounted near the opposite end of the base plate 13 and is adapted to be rotated by means of a suitable hand crank 18. A receptacle 20 composed of an electrical insulating material and containing a bath 21 of electrolyte is supported upon the base plate 13 intermediate the supply reel and the take-up drum. The electrolyte bath 21 is connected, preferably by means of a platinum electrode 24, to the positive terminal of a direct current supply source 25, the negative terminal of which is connected to the metallic take-up drum 15, through a contact brush 26. The end of the enameled wire 11 is bared and electrically connected to the take-up drum 15 by means of a set screw 28. By turning the crank handle 18, the enameled wire 11 to be tested is drawn from the supply reel 10 through the electrolyte bath 21, and is then wound around the take-up drum 15. A guide sheave 30 composed of insulating material is mounted within the receptacle 20 and serves to constantly maintain the wire submerged within the bath 21. A counter 32 or other suitable measuring device is connected to the take-up drum shaft for indicating the amount of wire that has been tested.

In practicing the method, it is preferred to employ an electrolyte bath consisting of a 10% sulphuric acid solution, although the quantity of the acid in the solution may be varied considerably. It is to be understood, also, that various other electrolytes may be employed with beneficial results. For example, any acid or salt which is soluble in water and which is ionizable, satisfactorily serves the purpose. The following have been tried with success: acetic acid, boric acid, hydrochloric acid, nitric acid, oxalic acid, phosphoric aid, picric acid, potassium sulphate, barium chloride, sodium hydroxide, sodium bicarbonate, and sodium chloride.

By observing the wire as it passes through the electrolyte bath, poorly insulated or bare spots may be readily detected by the evolution of hydrogen gas, and thus with the aid of the measuring device 32, the number of poorly insulated or bare spots in a given length of the wire under test may be readily ascertained by observing the frequency of the hydrogen gas evolution. It has been found that small pin holes in the insulation which could not be detected by testing methods heretofore employed may be readily detected by employing the method and apparatus of the present invention.

It is apparent that the embodiment of the invention herein illustrated and described is merely a convenient and useful form of the invention which is capable of modification within the scope of the appended claims.

What is claimed is:

1. The method of testing an insulating coating on a core, which consists in immersing a single strand of the insulated core in an ionizable liquid, subjecting the core and the liquid to a small electrical potential difference, and observing the gas evolution at the core to determine the discontinuity of the insulating coating.

2. The method of testing an insulating coating on a core, which consists in immersing a single strand of the core in an ionizable electrolyte, subjecting the core and the electrolyte to a small difference of electrical potential with respect, to each other, and observing the gas evolution at the core to ascertain the number of defective portions of the insulation.

3. The method of testing an insulating coating on a metallic core, which consists in immersing a single strand of the core in an acid solution, electrically connecting the core and the solution to opposite sides of a direct current low voltage supply source, and observing the gas evolution on the immersed core to ascertain the number of defective portions of the insulation in the immersed length thereof.

4. The method of testing an insulating coating on an electrical conductor, which consists in immersing a single strand of the conductor in a sulphuric acid solution, maintaining a low voltage difference between one end of the conductor and the sulphuric acid solution, and observing the hydrogen gas evolution from the immersed conductor to ascertain the number of defects in the insulation of the immersed length of the conductor.

5. In an apparatus for testing an insulating coating on a single strand of an electrical conductor, a receptacle containing a bath of sulphuric acid in solution with water, means for immersing and retaining the conductor in the bath, means for measuring the length of the conductor immersed in the bath, a direct current low voltage supply source, means for maintaining an electrical connection between the conductor and the current supply source, and means for contemporaneously maintaining an electrical connection between the current supply source and the bath.

6. The method of testing an insulating coating on an electrical conductor, which consists in immersing a single strand of the conductor and coating in an ionizable bath, subjecting the conductor and the bath to a predetermined direct current low voltage, and observing the evolution of gas at the conductor to ascertain the number of defects in the insulation in the immersed length of the conductor.

In witness whereof, I hereunto subscribe my name this 11th day of October, A. D. 1929.

WILLIAM H. EASTLAKE.